United States Patent [19]
Felix

[11] 4,177,483
[45] Dec. 4, 1979

[54] PROCESS AND ARRANGEMENT FOR RECONSTITUTING THE THERMAL FLUX ABSORBED BY A PYROELECTRIC TARGET

[75] Inventor: Pierre Felix, Paris, France
[73] Assignee: Thomson-CSF, Paris, France
[21] Appl. No.: 868,248
[22] Filed: Jan. 10, 1978
[30] Foreign Application Priority Data
   Jan. 11, 1977 [FR] France ................ 77 00614
[51] Int. Cl.² .................................. H04N 5/33
[52] U.S. Cl. .......................... 358/113; 358/166; 250/333
[58] Field of Search ............. 358/113, 211, 161, 163, 358/164, 166, 167; 250/330, 333, 334, 332

[56] References Cited
U.S. PATENT DOCUMENTS
3,971,886  7/1976  Chow .................. 358/113
4,121,248  10/1978 Coale, Jr. ............. 358/113

Primary Examiner—Robert L. Griffin
Assistant Examiner—Edward L. Coles
Attorney, Agent, or Firm—Roland Plottel

[57] ABSTRACT

Process and arrangement for reconstituting the signal representing the thermal flux absorbed by a pyroelectric target, the arrangement being used in infrared camera tubes. It comprises means for correcting the signal Sn for reading a point of co-ordinates x, y of the target, during a frame of order n, comprising means for calculating a first component representing the Laplacian of the signal Sn and means for summating the signal Sn with the first component. The correcting means deliver a corrected signal. Means for generating a complementary signal are connected to the output of the calculating means and comprise means for generating a signal representing the temperature $\theta_{n-1}$ of the point of co-ordinates x, y during the reading of that point in the course of a frame of order $n-1$ and a second component representing the Laplacian of that temperature. Means for summating the complementary signal with the corrected signal deliver the reconstituted signal.

9 Claims, 3 Drawing Figures

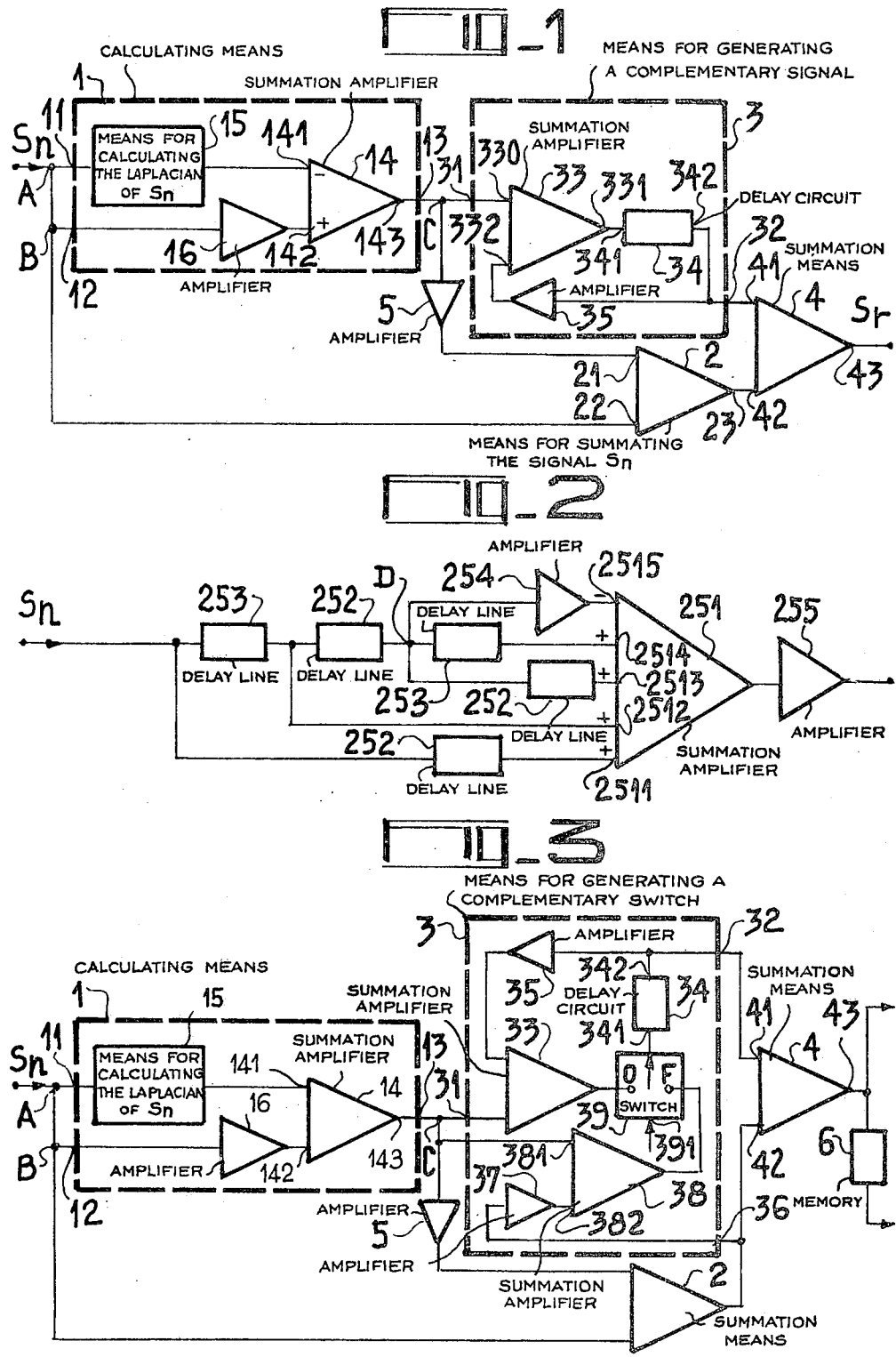

PROCESS AND ARRANGEMENT FOR RECONSTITUTING THE THERMAL FLUX ABSORBED BY A PYROELECTRIC TARGET

This invention relates to an arrangement for reconstituting the signal representing the thermal flux absorbed by a sensitive surface using the pyroelectric effect, such as for example that of an infrared camera system, and to the camera system incorporating this arrangement.

In camera systems using sensitive surfaces of the type in question, a pyroelectric target or mosaic of pyroelectric detectors, an electrical polarisation profile and, hence, an induced electrical charge profile, i.e. an electrical potential profile, is created by the incident radiation absorbed by the sensitive surface over the extent thereof. At each point of the sensitive surface, the potential profile is sequentially analysed by destructive reading, corresponding to an injection of compensating charges, or by non-destructive reading in the absence of injected charges.

In the case of destructive reading, the signal collected at a point of the sensitive surface, equal to the compensation charge injected, is proportional to the variation in temperature at that point between two analysis instants.

In the case of non-destructive reading, the information stored in the form of an electrical potential degrades at the thermal equilibrium by dielectric relaxation within the pyroelectric material. For each type of analysis, the temperature at each point of the sensitive surface has to undergo variations as a function of time induced either by a relative movement between the subject and the camera system or by a sequential modulation of the flux of the incident radiation. The signal collected during the reading of each point of the sensitive surface is proportional to the temperature variation at that point between two analysis instants.

This type of analysis is attended by the disadvantage that it does not faithfully reconstitute the thermal flux due to the incident radiation. In particular, the image of a hot point moving over the sensitive surface is followed by a trail due to the cooling of the sensitive surface after passage of the image. In addition, camera systems using sensitive surfaces such as these are limited in terms of spatial resolution by lateral diffusion of the heat within the sensitive surface.

The present invention enables the disadvantages referred to above to be obviated by using a process for reconstituting the signal representing the thermal flux absorbed by the sensitive surface of a camera system using the pyroelectric effect in which, during a periodic reading by successive frames of the sensitive surface and for each point of co-ordinates x, y thereof, the reading signal Sn of a point of co-ordinates x, y is corrected during the reading of the point of co-ordinates during a frame of order n by summation with the signal Sn of a first component representing the Laplacian of the reading signal, enabling a corrected reading signal to be generated, and a complementary signal is added to the corrected reading signal, said complementary signal being formed by a signal representing the temperature of the point of co-ordinates x, y at the reading instant during the frame of order $k \leq n$ and by a second component representing the Laplacian of that temperature.

The invention also relates to an arrangement for reconstituting the signal representing the thermal flux absorbed by the sensitive surface of a camera system using the pyroelectric effect, comprising means which periodically read said sensitive surface by successive frames and which deliver a reading signal Sn of a point of co-ordinates x, y during the reading of this point during a frame of order n, the arrangement additionally including means for correcting the signal Sn comprising means for calculating a first component representing the Laplacian of the signal Sn and means for summating the signal Sn with said first component, said correcting means delivering a corrected signal at the output of the summation means, means for generating a comlementary signal connected to the output of said calculating means and comprising means for generating, on the one hand, a signal representing the temperature $\theta_{n-1}$ of the point of co-ordinates x, y during the reading of the point of co-ordinates during a frame of order n−1 and, on the other hand, a second component representing the Laplacian of said temperature, and means for summating the complementary signal and the corrected signal and delivering the reconstituted signal.

The arrangement and process according to the invention are applicable to thermal television camera tubes comprising a sensitive surface formed by a pyroelectric target from which the information is sequentially extracted in the form of current or voltage, and in particular to camera systems of which the sensitive surface is formed by a mosaic of pyroelectric detectors.

The invention will be better understood from the following description in conjunction with the accompanying drawings where the same references denote the same elements and wherein:

FIG. 1 shows an arrangement according to the invention.

FIG. 2 shows part of the arrangement illustrated in FIG. 1.

FIG. 3 shows one particular embodiment of the arrangement according to the invention.

According to the invention, the instantaneous signal Sn for a point of co-ordinates x, y issuing from the reading during a frame of order n is compared and corrected with the signals issuing from the reading of this same point during preceding frames. The signal Sn read at a point of co-ordinates x, y during a frame of order n is associated with the thermal flux actually absorbed by the sensitive surface at this point between two reading instants during two consecutive frames, for example a frame of order n and a frame of order n−1, by the following relation (I):

$$\frac{1}{Ce} \int_{(n-1)T}^{nT} H(x,y,t)dt = [1 + \frac{T}{2}(\frac{1}{\tau} - D\Delta)] S_n + T(\frac{1}{\tau} - D\Delta)\theta_{n-1} \quad (I)$$

wherein:
t represents the variable time,
T represents the period of a frame between two analysis instants,
$\tau$ represents the thermal time constant of the pyroelectric target,
D represents the lateral thermal diffusion constant of the target Laplacian operator $$\frac{\delta^2}{\delta x^2} + \frac{\delta^2}{\delta y^2}$$

H (x,y,t) represents the power density absorbed at the point (x,y) at the instant(t), C represents the specific heat per unit volume of the pyroelectric material, e represents the thickness of the sensitive surface, $\theta_{n-1} = \theta$ (x,y, (n−1) T), the temperature of the surface at the point of co-ordinates x, y at the instant (n−1) T.

The above relation (I) is obtained assuming a linear variation in the temperature $\theta$ (x,y,t) of the point x, y between the instants (n−1) T and nT separating two reading instants of the point of co-ordinates x, y during two successive frames.

The expression $$\int_{(n-1)t}^{nT} H(x,y,t)dt,$$

which is the integral of the flux absorbed between two successive analysis instants, represents the useful information and the term Sn proportional to $\theta_n - \theta_{n-1}$ represents the read signal.

The assumption of a linear variation in the temperature $\theta$ (x,y,t) between the instants (n−1) T and nT is only strictly verified in the case of low spatial frequencies, i.e. frequencies below two pairs of lines per millimetre for a target of triglycine sulphate or TGS for the usual analysis standards. The characteristic variation times of this temperature, which are inversely proportional to the square of this spatial frequency, are long in relation to the frame period T of approximately 20 milliseconds for a tube with a pyroelectric target.

In the opposite case of high spatial frequencies, the error introduced by the non-linearity of the variation in the temperature $\theta$ (x,y,t) is compensated on average by the cooling phase of the point of co-ordinates x, y following its preceding heating phase.

The useful information or signal representing a thermal flux absorbed by the sensitive surface is reconstituted in two steps.

A first step consists in making a correction to the signal Sn read during a frame of order n by algebraically adding to the read signal Sn a first component representing the Laplacian of that signal. This correction is analogous to an opening correction effected by a filter favouring the high spatial frequencies.

A second step consists in adding to the corrected signal Sn a complementary signal formed by a signal representing the temperature $\theta_{n-1}$ of the point of co-ordinates x, y during the reading thereof during a frame of order n−1 or at the instant (n−1) T and by a second component representing the Laplacian of that temperature.

The process by which the useful information is reconstituted may be carried out by reconstituting the signal representing the thermal flux from signals Sn−1, Sn−2 ... Sn−p, the temperature $\theta_{n-(p+1)}$ of the point of co-ordinates x, y at the reading instant during the frame of order $k = n-(p+1)$ below n and the Laplacian of these quantities by virtue of the fact that the temperature $\theta_{n-1}$ is expressed by $\theta_{n-1} = Sn-1 + Sn-2 \ldots Sn-p + \theta_{n-(p+1)}$.

The process may be carried out by reconstituting the signal representing the thermal flux from the read signal Sn and the temperature $\theta_n$ of the point of co-ordinates x, y read during a frame of the same order because, due to the linear relation between Sn, $\theta_n$ and $\theta_{n-1}$ so that $Sn = \theta_n - \theta_{n-1}$, it is possible to express $\theta_{n-1}$ as a function of Sn and $\theta_n$, the relation (I) thus becoming:

$$\int_{(n-1)T}^{nT} H(x,y,t)dt = \qquad (I)$$

$$[1 - \frac{T}{2}(\frac{1}{\tau} - D\Delta)] Sn + T(\frac{1}{\tau} - D\Delta)\theta_n$$

This definition of the integral of the absorbed flux is obtained by adding to the corrected reading signal $(1 - (T/2)(1/\tau - D\Delta))$ Sn a complementary signal representing the temperature $\theta_n$ of the point of co-ordinates x, y at the reading instant during the frame of the same order k=n and by a second component representing the Laplacian of that temperature. However, these last two functions, which define the integral of the flux absorbed from quantities other than Sn and $\theta_{n-1}$, do not provide for precise separation of the correction steps of the signal, said steps corresponding to the aperture correction mentioned above during the definition as a function of Sn and $\theta_{n-1}$.

In one preferred embodiment of the invention, the first component representing the Laplacian at the point of co-ordinates x, y of the signal Sn is obtained by using a signal representing the Laplacian of the signal Sn at the point of co-ordinates x, y and obtained by comparison of the signal Sn at at least four comparison points of the sensitive surface separated by a distance d on either side of the point of co-ordinates x, y. These four points are preferably situated in twos symmetrically in relation to the point of co-ordinates x, y. The directions joining two symmetrical points are respectively parallel to the axes of co-ordinates of the pyroelectric target. A larger number of comparison points may also be used with a view to obtaining a more precise signal representing the Laplacian operator of the signal Sn without departing from the scope of the invention. In the preferred embodiment of the invention, the separation by a distance d of the comparison points enabling the signal representing the Laplacian of the signal Sn to be obtained is obtained by using a number of delayed signals Sn, of predetermined delay, corresponding to the various comparison points of the sensitive surface. Thus, assuming an analysis of the pyroelectric target by lines of the standard television type, a vertical translation by a distance d from a point of co-ordinates x, y corresponds to a delay time V in the signal Sn corresponding to one or more analysis lines. In the same way, a horizontal translation by a distance d from the point of co-ordinates x, y corresponds to a delay time H in the signal Sn allowing for the speed of analysis on a line. The Laplacian of the signal Sn at the point of co-ordinates x-d, y-d and for four comparison points for example is expressed by the relation (II):

$$S(x-d,y-d) = (1/d^2)S[(t-H)+S(t-V)+S(t-2H-V)+S(t-2V-H)-4S(t-H-V)] \qquad (II)$$

Summation of said delayed signals gives a signal representing the Laplacian of Sn. The delay times H and V are imposed for a given analysis standard, taking into account the distance d which has to be selected. This distance d is selected to be of the order of the resolution element of the target, i.e. typically 200 micrometers.

The complementary signal formed by a signal representing the temperature $\theta_{n-1}$ of the point of co-ordinates x, y and by the second component representing the Laplacian of that temperature is obtained by summation of the successive signals. Thus, the signal representing the temperature $\theta_{n-1}$ is obtained by summation of the successive signals $\theta_{n-1} = Sn-1+Sn-2+ \ldots +S1+\theta_0$, $\theta_0$ being the initial temperature of the target which is assumed to be uniform, whilst $\Delta\theta_{n-1}$ — the Laplacian of the temperature $\theta_{n-1}$ —is obtained by summation of the Laplacians of the successive signals, the Laplacian operator being a linear operator.

The arrangement according to the invention illustrated in FIG. 1 provides for reconstitution of the signal representing the thermal flux absorbed by the sensitive surface of a camera system using the pyroelectric effect comprising means for periodically reading the sensitive surface by successive frames. At one of its terminals, the system delivers a reading signal Sn of a point of co-ordinates x, y during the reading thereof in the course of a frame or order n. The arrangement comprises means for correcting the signal Sn. These correcting means comprise means 1 for calculating a first component representing the Laplacian of the signal Sn. The input terminals 11 and 12 of the calculating means 1 are connected to the terminal of the camera system delivering the signal Sn. The output 13 of the calculating means 1 delivers said first component representing the Laplacian of the signal Sn. The output 13 of the calculating means is connected by an amplifier 5 of gain ½ to the input 21 of means 2 for summating the signal Sn with the first component. The output 23 of the summation means 2 delivers a corrected signal. The output 13 of the calculating means 1 is also connected to the input 31 of means 3 for generating a complementary signal and comprising means for generating, on the one hand, a signal representing the temperature $\theta_{n-1}$ of the point of co-ordinates x, y during the reading thereof in the course of a frame of order n−1 and, on the other hand, a second component representing the Laplacian of that temperature. The output terminal 32 of the means 3 for generating the complementary signal is connected to the input 41 of summation means 4 of which the input terminal 42 is connected to the output 23 of the summation means 2. The output terminal 43 of the summation means 4 delivers the reconstituted signal $S_r$.

In one particular embodiment of the arrangement according to the invention illustrated in FIG. 1, the means 1 for calculating the first component representing the Laplacian of the signal Sn comprise a summation amplifier 14. The summation amplifier 14 has a difference input 141 connected to the terminal of the system delivering the signal Sn by the input terminal 11 through means 15 for calculating the Laplacian of the signal. The sum input 142 of the summation amplifier 14 is connected to the terminal of the camera system delivering the signal Sn through an amplifier 16 of predetermined gain. The gain of the amplifier 16 is equal to $T/\tau$. The output terminal 143 of the summation amplifier 14 connected to the output 13 of the calculating means 1 delivers the first component. The means for generating the complementary signal comprise a summation amplifier 33. A sum input 330 of the summation amplifier 33 is connected by the input terminal 31 of the calculating means 3 to the output 13 delivering the first component. The output 331 of the summation amplifier 33 is regeneratively connected by a delay circuit 34 of delay T and an amplifier 35 of gain G between 0 and 1, $0<G\leq 1$, to a second sum input 332 of the amplifier 33. The output terminal 342 of the delay circuit 34 connected to the output terminal 32 of the means for generating a complementary signal 3 delivers the complementary signal. The arrangements operates as follows:

The first component is delivered by the output terminal 143 of the summation amplifier 14 to the point C in FIG. 1. The summation of the signal Sn with the first component is carried out by the summation means 2 which, at their output 23, deliver the corrected signal Sn. The corrected signal Sn is expressed as follows:

$$Sn_c = [1+(T/2)(1/\tau - D\Delta)]Sn$$

At their output 32, the means for generating the complementary signal 3 deliver, on the one hand, the signal representing the temperature $\theta_{n-1}$ of the point of co-ordinates x, y and, on the other hand, the second component representing the Laplacian of that temperature by approximation of $\theta_{n-1}$ by the quantity $$\theta_{n-1} = \sum_{k=0}^{k=n-1} G^k S_{n-(k+1)}$$

and by progressive reduction of the influence of the signals corresponding to the previous frames where G represents the gain of the amplifier 35. In this case, the gain G of the amplifier 35 is less than 1, G<1. This avoids the disadvantage, when the temperature $\theta_{n-1}$ is being obtained by summation of the successive signals, of introducing a noise level which is greater, the larger the number of frames coming into play, the incoherent noise being proportional to the square root of the number of frames and the spatial noise to the number of frames used. The delay circuit 34 enables the signals to be delayed by a time equal to the frame period T. The delay circuit may advantageously be formed by a digital memory or by a charge transfer register or by two memory tubes.

The second component representing the Laplacian of that temperature is also obtained at the level of the output terminal 342 of the delay circuit 34 by virtue of the fact that the Laplacian operator is a linear operator, the sum of the Laplacians of the signals Sn representing the Laplacian of the sum of those signals and hence of the corresponding temperature. According to FIG. 2, the means 15 for calculating the Laplacian of the signal Sn comprise a summation amplifier 251 followed by an amplifier 255 of gain $DT/d^2$. The inputs 2511, 2512, 2513, 2514 of the amplifier 251 correspond to the number of comparison points of the reading signal separated on the sensitive surface by a distance d from the point of co-ordinates x, y. These input terminals are each connected to the output terminal of the camera system delivering the signal Sn by means of delay lines 252, 253. Each delay line 252, 253 respectively produces in the signal Sn a delay H and V respectively corresponding to a translation by d along the co-ordinate axis x and the co-ordinate axis y of the sensitive surface.

The arrangement shown in FIG. 2 in fact corresponds to the calculating of the Laplacian of the signal Sn at a point of co-ordinates x-d, y-d for four comparison points, the input 2515, the difference input, being fed by the signal Sn through two cascaded delay lines 253 and 252 and an amplifier 254 having a gain equal to 4, the input 2514 being fed by the signal Sn through two delay lines 253 and one delay line 252 in cascade, the input 2513 through two delay lines 252 and one delay line 253 and the input 2511 through one delay line 252. In this case, the connection between the points A and B of FIG. 1 has to be modified by the addition between these two points of a delay line 252 and a delay line 253 connected in cascade and enabling the corresponding stagger equal to d to be obtained between the co-ordinates x, y of the point in question. The point B disconnected from the point A may also be directly connected to a point D such as shown in FIG. 2 in the case where means for calculating the Laplacian of the signal Sn corresponding to the illustration of FIG. 2 are used. This solution enables the delay lines 252 and 253 inserted between the points A and B, as indicated above, to be saved. Any similar arrangement comprising a different number of points at which the reading signal is extracted and providing for calculation of the Laplacian of the reading signal for a point of the sensitive surface falls within the scope of the present invention.

The particular embodiment of the arrangement according to the invention illustrated in FIG. 3 relates to a camera system in which the thermal flux is sequentially interrupted, as for example in operation with a shutter. By assumption, the useful thermal flux absorbed is zero during the closure phases, which enables the temperature $\theta_{n-1}$ to be determined without integration with the preceding frames, the equation giving the thermal flux absorbed during the closure phase being expressed by the following relation (III):

$$0 = [1 + T/2(1/\tau - D\Delta)]Sn + T[(1/\tau - D\Delta)]\theta_{n-1} \quad \text{(III)}$$

In FIG. 3, the means for generating the complementary signal representing the temperature $\theta_{n-1}$ and the second component representing the Laplacian of that temperature comprise a summation amplifier 38 in addition to the arrangement shown in FIG. 1. A first sum input 381 is connected to the output 13 of the means 1 delivering the first component. A second sum input 382 is connected to the output terminal of the summation amplifier 2 by an amplifier 37 of gain $-1$. The output terminal of the summation amplifier 38 and the output terminal of the summation amplifier 33 are connected by a common switch 39 to the input terminal 341 of the delay circuit 34. In operation, the output terminals of the summation amplifiers 33 and 38 are alternately connected to the input terminal 341 of the delay circuit 34 by a signal in synchronism with the closure sequence applied to a control terminal 391 of the switch 39. The positions F and O of the switch correspond to the open and closed positions of the shutter. The output 43 of the summation means 4, of which the inputs 41 and 42 are respectively connected to the outputs 342 of the delay circuit 34 and to the output of the summation means 2, comprises a memory 6.

In operation, the switch 39 is switched to the position F when the shutter is closed and to the position O when it is open. Accordingly, resetting to zero is obtained each time the shutter closes by the direct determination of $\theta_{n-1}$ in accordance with the relation III during that instant by the complementary circuits of the summation amplifier 38. The memory 6 enables the signal presented during the opening phases to be restored during the closure phases of the shutter.

The amplifier 35 of gain G in the embodiment shown in FIG. 3 has a gain equal to 1 or is merely replaced by a regenerative connection. By virtue of the resetting to zero effected by the direct determination of $\theta_{n-1}$ during the closure phase of the shutter and the use of the signal representing $\theta_{n-1}$ from the beginning of the following opening sequence of the shutter, this modification enables all the preceding frames to be taken into account without any disadvantage. The precision of the complementary signal is thus improved without significantly increasing the noise level.

Of course, the invention is not limited to embodiment described and shown which was given solely by way of example.

What we claim is:

1. An arrangement for reconstituting the signal representing the thermal flux absorbed by the sensitive surface of a camera system using the pyroelectric effect, comprising means for periodically reading said sensitive surface by successive frames and delivering a signal Sn for reading a point of co-ordinates x,y during the reading thereof in the course of a frame of order n, comprising:

means for correcting the signal Sn comprising means (1) for calculating a first component representing the Laplacian of the signal Sn and means (2) for summating said signal Sn with said first component, said correcting means delivering a corrected signal at the output (23) of said summation means (2), means (3) for generating a complementary signal connected to the output (13) of said calculating means (1) and comprising means for generating on the one hand a signal representing the temperature $\theta_{n-1}$ of the point of co-ordinates x, y during the reading of said point in the course of a frame of order $n-1$ and, on the other hand, a second component representing the Laplacian of said temperature, means (4) for summating said complementary signal and the corrected signal and delivering the reconstitute signal.

2. An arrangement as claimed in claim 1, in which said means (1) for calculating the first component representing the Laplacian of the signal Sn comprise a summation amplifier (14) of which the difference input (141) is connected to a terminal of the camera system delivering said signal Sn through means (15) for calculating the Laplacian of said signal and of which the sum input (142) is connected to said terminal of the camera system delivering the signal Sn through an amplifier (16) of predetermined gain, the output terminal (143) of said summation amplifier (14) delivering said first component.

3. An arrangement as claimed in claim 1, in which said means for generating the signal representing the temperature $\theta_{n-1}$ of the point of co-ordinates x, y and the second component representing the Laplacian of that temperature, comprise a summation amplifier (33) of which a sum input (330) is connected to said output (13) delivering said first component and of which the output (331) is regeneratively connected by a delay circuit (34) and an amplifier (35) with a gain G between 0 and 1, $0 < G \leq 1$, to a second sum input (332) of said amplifier, the output terminal (342) of the delay circuit delivering said complementary signal.

4. An arrangement as claimed in claims 1, in which said means (15) for calculating the Laplacian of the signal Sn comprise a summation amplifier (251) of which the inputs (2511), (2512), (2513), (2514), corresponding to the number of comparison points of the reading signal separated on the sensitive surface by a distance d from the point of co-ordinates x, y, are connected to the output terminal of the camera system delivering the signal Sn by delay lines (252), (253), respectively having fixed delays H, V corresponding to said distance d according to the analysis standard of the sensitive surface in respectively horizontal and vertical directions parallel to the co-ordinate axes x, y, the output of said summation amplifier (251) delivering a signal representing the Laplacian of the signal Sn through an amplifier (255) of gain $DT/d^2$ where T represents the duration of a reading frame and D represents the lateral thermal diffusion constant of the target.

5. An arrangement as claimed in claim 4, in which said means for generating the signal representing the temperature $\theta_{n-1}$ of the point of co-ordinates x, y and the second component representing the Laplacian of that temperature additionally comprise a summation amplifier (38) of which a first sum input (381) is connected to the output delivering said first component and of which a second sum input (382) is connected to the output terminal of said summation amplifier (2) through an amplifier (37), the output terminal of said summation amplifier (38) and the output terminal of said summation amplifier (33) being alternately connected in operation to the input terminal (341) of said delay circuit (34) by a switch (39) controlled by a terminal (391) in synchronism with the shutter sequence, the output terminal of said summation means (4), of which one input (41) is connected to the output terminal (342) of the delay circuit (34), delivering the reconstituted signal by way of a memory (6) during the closure phase of the shutter sequence.

6. A process for reconstituting the signal representing a thermal flux absorbed by the sensitive surface of a camera system using the pyroelectric effect, wherein, during a periodic reading by successive frames of said sensitive surface and for each point of co-ordinates x, y, the following steps are effected:

correction of the signal $S_n$ for reading a point of co-ordinates x, y, during the reading thereof, in the course of a frame of order n, by summation with said signal $S_n$ of a first component representing the Laplacian of said reading signal enabling a corrected reading signal to the generated;

summation of a complementary signal to the corrected reading signal, said complementary signal being formed by a signal representing the temperature of the point of co-ordinates x, y at the instant of reading during the frame of order $k \leq n$, and by a second component representing the Laplacian of that temperature.

7. A process as claimed in claim 6, wherein the complementary signal is formed by a signal representing the temperature $\theta_{n-1}$ of the point of co-ordinates x, y, at the instant of reading during the frame of order $n-1$, and by a second component representing the Laplacian of that temperature.

8. A process as claimed in claim 7, wherein the component representing the Laplacian of the signal at the point of co-ordinates x,y, is obtained by comparison and summation of said signal at least five points of the sensitive surface, one of the points being the point of co-ordinates x,y and at least four other comparison points being symmetrically staggered by a distance d about the point of co-ordinates x, y, the directions of straight lines passing through two symmetrical points relative to the point of co-ordinates x,y being respectively parallel to the co-ordinate axes x,y associated with the sensitive surface.

9. A process as claimed in claim 8, wherein the staggering by a distance d of the comparison points enabling the signal representing the Laplacian of the signal $S_n$ to be provided, is obtained by using signals $S_n$ delayed by delays H and V corresponding to the various comparison points of the sensitive surface.

* * * * *